(12) United States Patent
Blyden et al.

(10) Patent No.: US 7,324,879 B2
(45) Date of Patent: Jan. 29, 2008

(54) START SWITCH SYSTEM FOR REMOTE STARTING MANUAL TRANSMISSION AUTOMOBILES

(76) Inventors: Ira Blyden, 2404 Gunther Ave., Bronx, NY (US) 10469; Van Blyden, 2404 Gunther Ave., Bronx, NY (US) 10469

( * ) Notice: Subject to any disclaimer, the term of this patent is extended or adjusted under 35 U.S.C. 154(b) by 271 days.

(21) Appl. No.: 10/936,345

(22) Filed: Sep. 8, 2004

(65) Prior Publication Data

US 2006/0052910 A1    Mar. 9, 2006

(51) Int. Cl.
*G06F 7/00* (2006.01)
*F02N 17/00* (2006.01)
(52) U.S. Cl. ............... 701/2; 701/36; 701/51; 123/179.1
(58) Field of Classification Search ........... 701/1–2, 701/51; 307/9.1, 10.6; 123/179.1, 179.2, 123/179.3; 290/38 C, 38 R, 37 R; 477/99
See application file for complete search history.

(56) References Cited

U.S. PATENT DOCUMENTS

| 4,345,554 A | * | 8/1982 | Hildreth et al. .......... 123/179.2 |
| 5,000,139 A | * | 3/1991 | Wong ....................... 123/179.2 |
| 6,786,846 B2 | * | 9/2004 | Chang ......................... 477/99 |

* cited by examiner

*Primary Examiner*—Yonel Beaulieu
(74) *Attorney, Agent, or Firm*—Richard B. Klar; Law Office of Richard B. Klar

(57) ABSTRACT

A start switch system for autostarting by remote control a manual transmission vehicle having a gear shift lever is provided. The start switch system includes a start switch operatively connected to the gear shift lever and an autostart unit for autostarting the vehicle. In preferred embodiments, the start switch is a mercury switch. The switch and the autostart unit are electrically coupled to one another, with the autostart unit being responsive to the emission of a first set of signals from a remote control device for activating the autostart unit to autostart said vehicle. Moreover, the positioning of the gear shift lever operatively connected to the switch determines whether the autostart unit may be activated by the remote control for autostarting the vehicle.

26 Claims, 4 Drawing Sheets

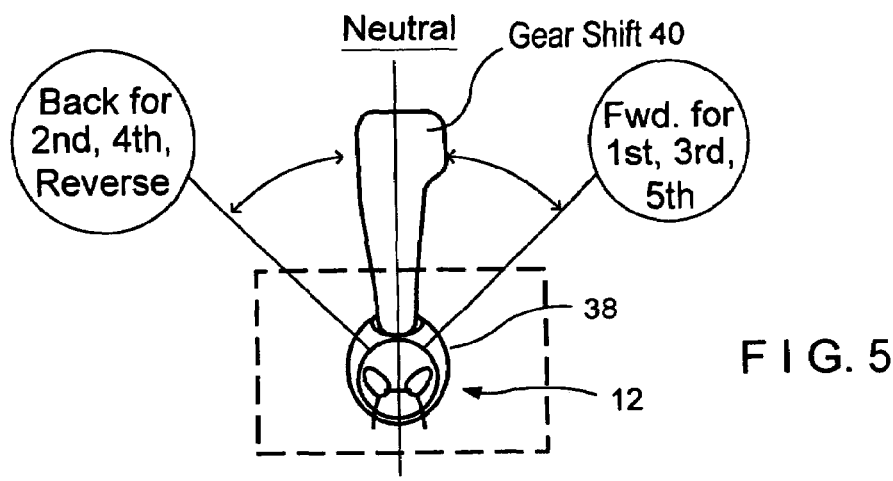
FIG. 5
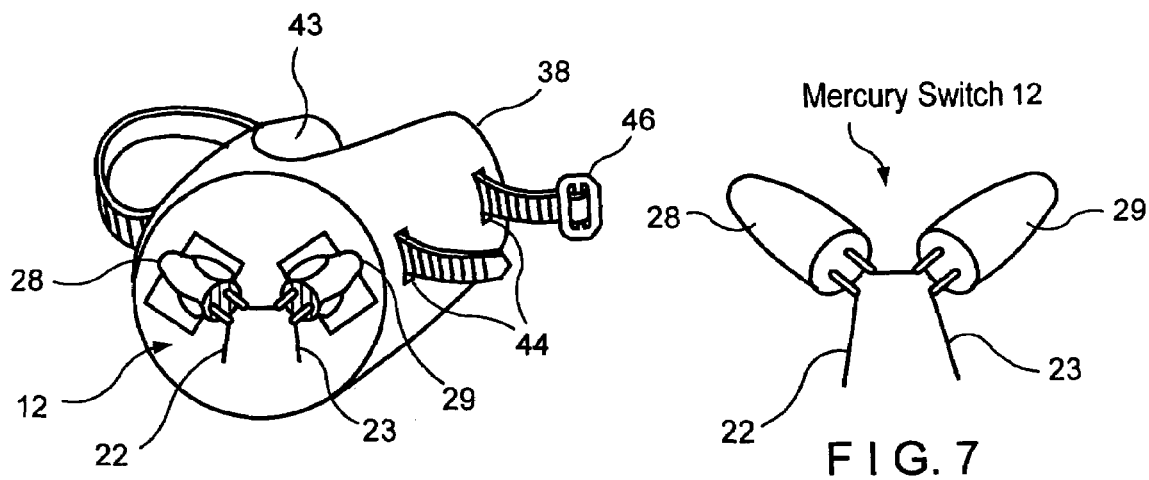
FIG. 6
FIG. 7
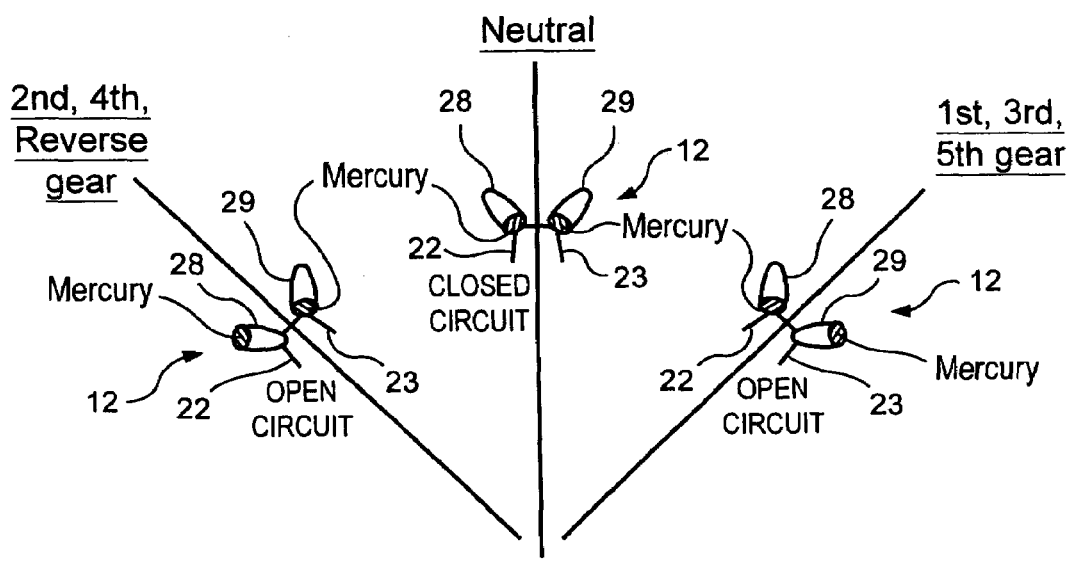
FIG. 8

START SWITCH SYSTEM FOR REMOTE STARTING MANUAL TRANSMISSION AUTOMOBILES

BACKGROUND OF THE INVENTION

1. Field of the Invention

This invention relates to remote autostarting a manual transmission vehicle using a remote control device in conjunction with a start switch system.

2. Prior Art

It is well known in the art to use switches, including mercury switches in conjunction with automobiles for different purposes. For Example, U.S. Pat. No. 2,986,616 purports to disclose electrical switches and more particularly adjustable mercury switches for controlling the ignition system of a tractor in response to a predetermined degree or angle of tilt of the vehicle. U.S. Pat. No. 4,371,051 purports to disclose automatic switching-off arrangements for the internal combustion engine of a motor vehicle comprising a sensor which sensors the neutral position of a gear control lever, the idle running condition of the engine or the standstill condition of the vehicle. When the sensor detects such a condition, a delay switch is energized which activates a switch-off means after a predetermined period so that the current supply to the ignition coil is interrupted or a half or a half compression device is operated and the engine is stopped. Further, U.S. Pat. No. 5,653,659 purports to disclose automatic engine stop-start system which automatically stops an engine to reduce the fuel consumption whenever a predetermined condition is fulfilled and automatically starts the engine whenever another predetermined condition is fulfilled. This system is particularly arranged to detect gearshift lever position of an automatic transmission to determine various automatic stop/start conditions so that an engine in a car with an automatic transmission can be automatically stopped/started.

Other patents and/or publications of interest include U.S. patent application Publication No. 2002/014059, U.S. Pat. No. 5,805,054, U.S. Pat. No. 5,900,678, U.S. Pat. No. 5,532,672, U.S. Pat. No. 4,001,777, U.S. Pat. No. 2,918,545.

In addition, it is also known in the art to pre-start automatic transmission vehicles prior to entry of these vehicles.

There is still a need in the art, however, for a unit or assembly for prestarting or autostarting a manual transmission vehicle via a remote control prior to entry into the vehicle because at the present time remote autostart is only available in automatic transmission vehicles. The advantages of having an autostart feature in manual transmission vehicles include allowing a driver of the manual transmission vehicle to start his or vehicle engine via the press of a button on a remote control device (autostart) prior to his or her entry into the vehicle. One particular benefit, is that the person using autostart does not have to depress a clutch pedal as is required in many manual transmission vehicles to start the vehicle. Other remote autostart benefits include being able to start up the engine to either pre-cool (e.g. air condition) or pre-warm (heat) the vehicle prior to entry into the vehicle, thereby ensuring that the driver and possibly other passengers enter into a comfortable vehicle interior. These benefits are especially appreciated on either a sweltering hot day in the summer or a blistering cold day in the heart of winter.

The remote start switch system of present invention provides a driver of a manual transmission car all the above autostart benefits (e.g. pre-cooling and/or pre-warming car) found in many automatic transmission cars as well as other benefits, while at the same time still preserving the enjoyments associated with driving a manual transmission vehicle. In addition, the present invention is also safe to use.

SUMMARY OF THE INVENTION

The present invention achieves the above goals by providing a remote start switch system activated via a remote control device for prestarting or autostarting a manual transmission vehicle. The start switch system comprises at least a start switch, e.g. mercury switch and an autostart module electrically coupled to one another. The mercury switch is also operatively connected to the gear shift lever of the manual transmission vehicle, so that the positioning of the gear shift, (either in neutral or in gear) determines whether the autostart unit may be activated, e.g. by remote control to autostart the vehicle. Namely, if the gear shift is in the neutral position then the electrical connection or circuit formed between the mercury switch and the autostart unit will be closed, thereby allowing the autostart unit to be activated by remote control to autostart the vehicle. Alternatively, if the gear shift lever is in gear (e.g. $1^{st}$, $2^{nd}$, $3^{rd}$ $4^{th}$ or $5^{th}$ gear or reverse), the mercury switch will cause the circuit between itself and the autostart unit to open, thereby preventing the autostart unit from being activated to autostart the vehicle.

In other embodiments, the start switch system further comprises an antennae sensor for receiving signals from the remote control to activate the autostart module and also includes an alarm module as well. In another preferred embodiment, the start switch system of any of the previous embodiments further includes an electronic safety switch, as an added measure of safety.

The term "autostart" is used herein to refer to starting up the engine for a manual transmission automobile, without the requirement of even entering the vehicle or maneuvering anything within the vehicle such as a clutch pedal, through the use of a remote control device electrically coupled to an autostart switch system.

In accordance with the present invention, a start switch system for autostarting by remote control a manual transmission vehicle having a gear shift lever is provided. The start switch system includes a start switch operatively connected to the gear shift lever and an autostart unit for autostarting the vehicle. In preferred embodiments, the start switch is a mercury switch. The switch and the autostart unit are electrically coupled to one another, with the autostart unit being responsive to the emission of a first set of signals from a remote control device for activating the autostart unit to autostart said vehicle. Moreover, the positioning of the gear shift lever operatively connected to the switch determines whether the autostart unit may be activated by the remote control for autostarting the vehicle.

In accordance with another aspect of the present invention, a mercury start switch system for autostarting a manual transmission vehicle having a gear shift lever and a clutch safety switch is provided. The mercury start system includes a mercury start switch operatively connected to the gear shift lever, a remote control device, an antennae sensor for receiving a first set of signals from a remote control device, an alarm unit and an autostart unit for activating the ignition of the vehicle to autostart the vehicle. The switch, antennae sensor, alarm unit and the autostart unit are electrically coupled to one another. Also, the antennae sensor transmits a second set of signals in response to the remote control device for activating the alarm module to transmit a third set of signals to activate the autostart unit to auto start the vehicle. Additionally, the positioning of the gear shift lever operatively connected to the mercury switch determines whether the autostart unit may be activated for autostarting the vehicle.

In yet another aspect of the present invention, a method for remote autostarting a manual transmission vehicle having a gear shift lever in neutral gear, using a start switch system. The start switch system includes a start switch and an autostart unit electrically coupled to one another. Further, the start switch is operatively connected to the gear shift lever. The method includes aiming a remote control device at the manual transmission vehicle for autostarting the vehicle; and then pressing a button on the remote control device to signal the autostart unit within the vehicle to autostart the vehicle. In addition, the position of the gear lever in neutral allows the autostart unit to be activated by the remote control to autostart the vehicle.

BRIEF DESCRIPTION OF THE DRAWINGS

FIG. 5 illustrates different positions of rotation of a gear shift lever having the mercury start switch mounted thereon via the plastic mount assembly;

FIG. 6 illustrates the plastic mount assembly with securing ties incorporated within slots in the assembly;

FIG. 7 illustrates the two tube mercury switch assembly in isolation;

FIG. 8 illustrates different positions for each of the two tubes of the two tube mercury switch in response to specific movements of the gear shift lever;

DETAILED DESCRIPTION OF THE INVENTION

Figure 1:
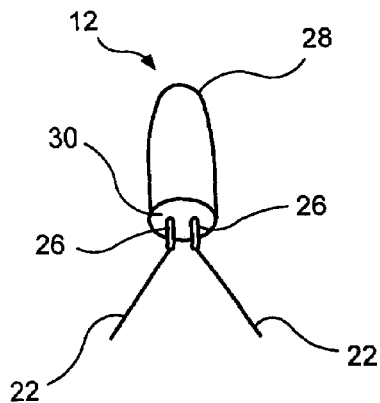
FIG. 1 depicts a single tube mercury switch of the present invention.

The start switch system of the present invention is a device that simply allows an automatic starting unit to remote auto-start a car that has manual transmission, via a start switch, e.g. mercury switch. The mercury start switch component of the start switch system is preferably mounted on the shaft of a gear shift. The start switch system is designed to allow the car to start any manual transmission as long as the car is not in gear, or on a steep hill or incline. If the car is in gear, the switch will not allow the car to start. This allows manual transmission cars to start safely with the press of a button from a remote control, just like automatic transmission cars. The device is designed so that the switch, e.g. mercury switch makes a positive connection only when the gear shift is completely vertical, allowing the manual transmission car to start when the automatic starting unit is activated. Anytime the gear shift is in first, second, third, fourth, fifth, or reverse, the mercury device disconnects the mercury connection, preventing the car to start by auto activation.

The start switch system 10 of a first embodiment of the present invention and its components are specifically illustrated in FIGS. 1-10. The start switch system 10 includes a switch element, such as a mercury switch 12 as shown in FIGS. 1-10, a remote antennae sensor 14 for sensing activation by a car remote control 16, and an autostart module 18. In other embodiments, the antennae sensor 14 is not included, but rather the autostart module 18 directly receives activation signals from the remote control device 16 for autostarting the vehicle.

Figure 9:
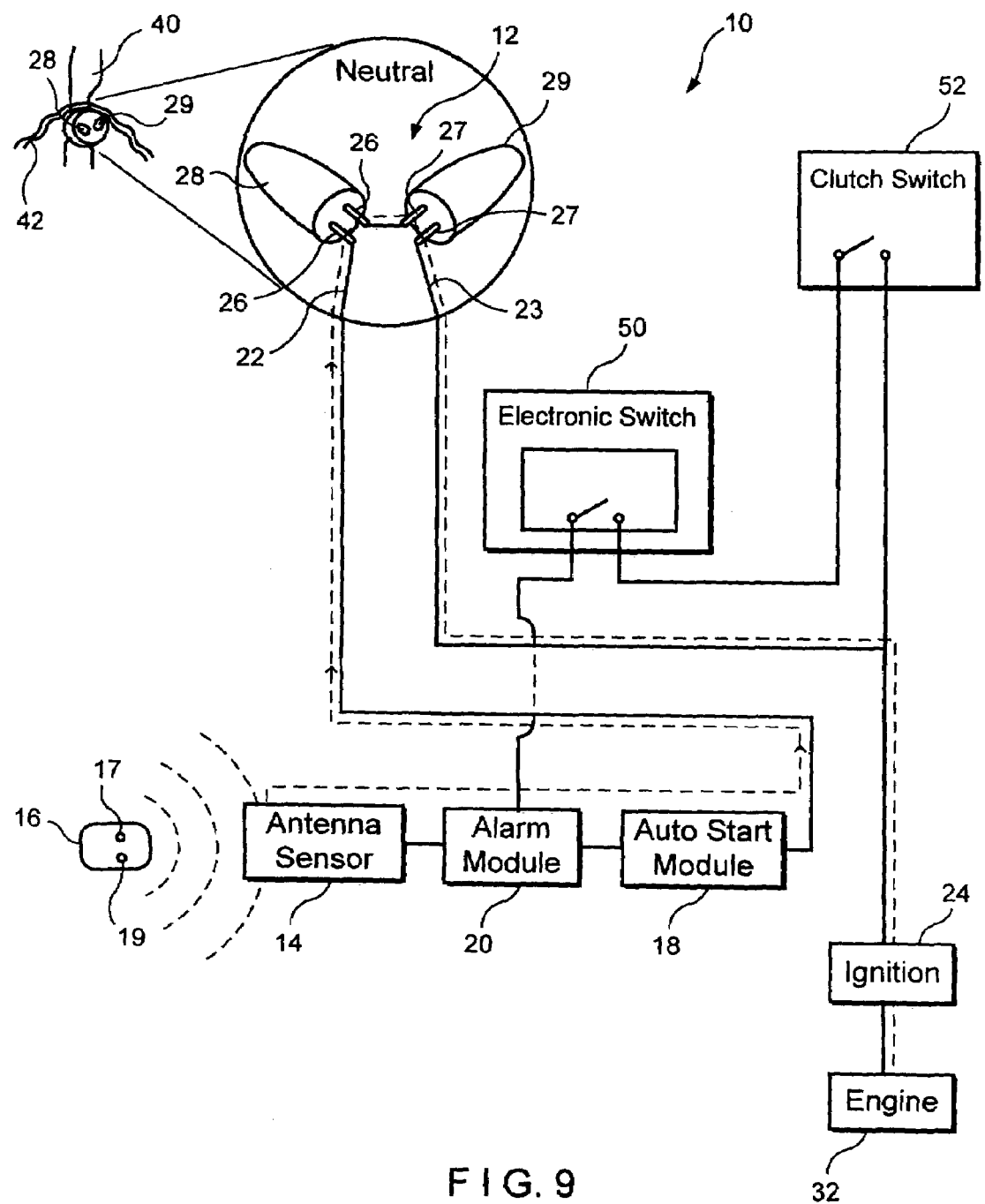
FIG. 9 illustrates the electrical connections between the components of the mercury start switch system of the first embodiment with the other relevant vehicle components, as well as an exploded view of the mercury switch.
Figure 10:
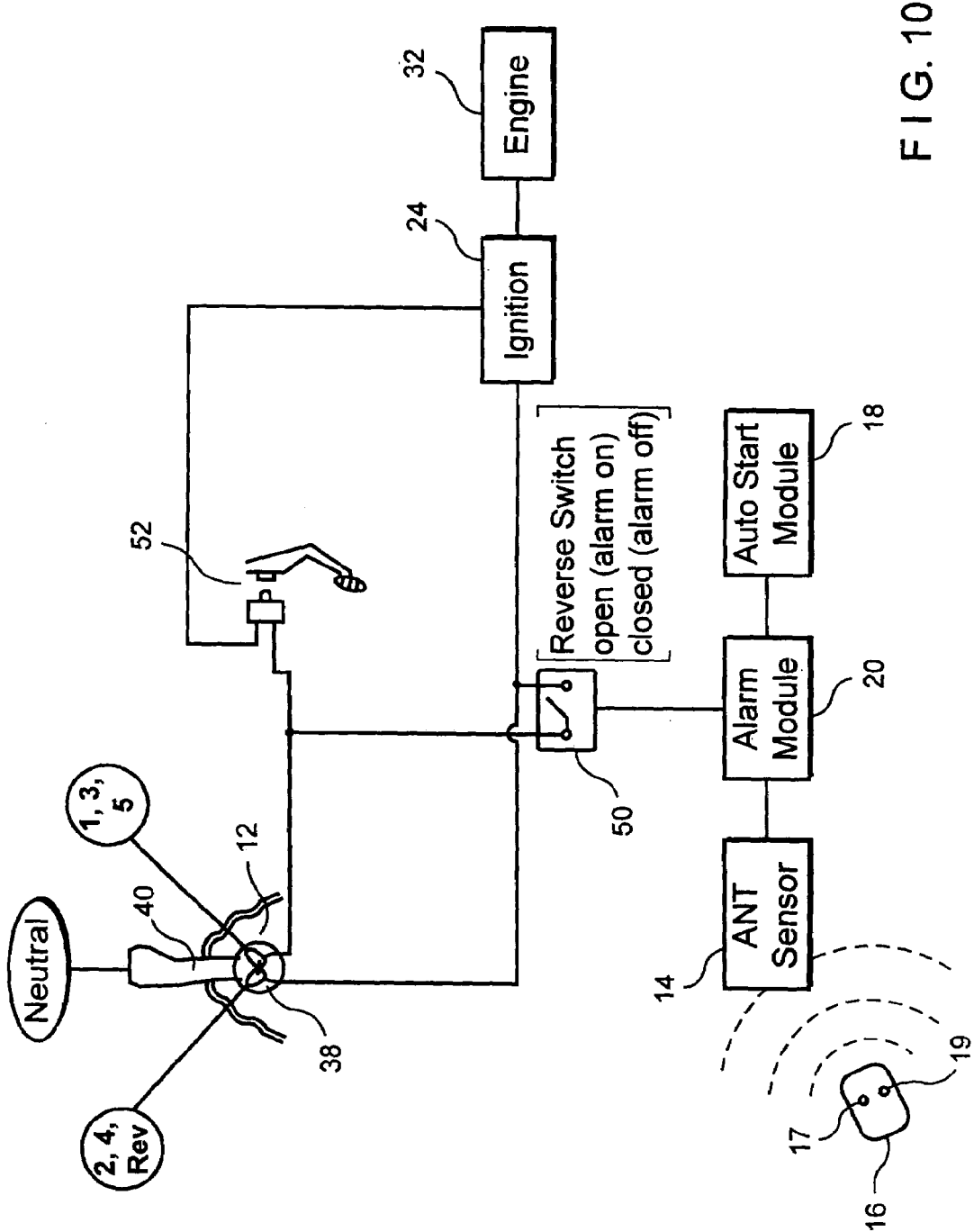
FIG. 10 illustrates the electrical connections between the components of the mercury start switch system of the first embodiment with the other relevant vehicle components.

Although not required, the start switch system 10 preferably further includes an alarm module 20 as shown in the first embodiment of FIGS. 9 and 10. In this embodiment of the present invention, the antenna sensor 14 receives activation signals from a remote control and the antennae sensor 14 is electrically connected to the alarm module 20 which in turn is electrically connected to the autostart 18 module. The autostart module 18 when activated starts the ignition 24 of the car. Further, external leads 22 from the mercury switch are connected in series to the ground lead between the alarm module 20 and the auto-start module 18 to either activate the autostart module 18 to start the ignition 24 or prevent the autostart module 18 from activating the ignition 24 to autostart the manual transmission car. A detailed illustration of the electrical/operative connections between each of the components of the first embodiment of the autostart system are specifically illustrated in FIGS. 9 and 10.

It is again noted that the mercury switch 12 is operatively connected to the gear shift lever 40 of a manual transmission car (e.g. mounted on the gear shift lever). Further, the mercury switch 12, in response to movement of the gear shift lever 40 either opens or closes a circuit or electrical connection between itself and the alarm module 20 and autostart module 18. Namely, if the gear shift lever 40 is in the neutral position then the circuit or electrical connection between the mercury switch 12 and the alarm module 20 and autostart module 18 remains closed, thereby allowing the autostart module 18 to be activated by the remote control device 16 to autostart the vehicle. Alternatively, if the gear shift lever 40 is in gear (1st, 2nd, 3rd, 4th 5th or reverse) then the mercury switch 12 will open the circuit between itself and the alarm module 20 and the autostart module 18, thereby preventing the autostart module 18 from being activated to autostart the manual transmission vehicle Different sub-embodiments for the mercury switch 12 are discussed below.

In one embodiment for the mercury switch 12 shown in FIG. 1, the mercury switch 12 includes two contact leads 26 inside a capsule or tube 28, preferably a small glass tube 28, with each contact lead 26 having an external lead 22 or wire and a small amount of mercury 30 located in the tube 28 as well. In controlled conditions, balance and gravity allow the capsule or tube 28 to behave like a switch. If the mercury tube 28 at rest sits upright (vertically on a horizontal plane), the mercury 30 inside the tube rests on the bottom on the two contact leads 26 inside the tube as shown in FIG. 1. When the mercury 30 is located in this position in the tube 28, this closes a potential circuit between the two external leads 22 (closed circuit position or on position). This position allows the auto start module 18 (preferably factory installed), to engage the automobile ignition system 24 (shown in FIGS. 9 and 10), which in turn starts the engine 32.

Figure 2:
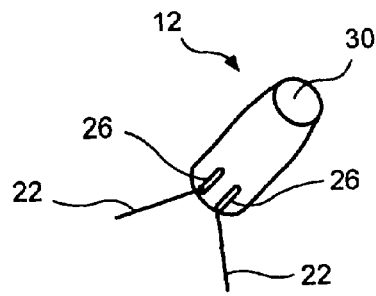
FIG. 2 depicts a single tube mercury switch of the present invention rotated at an angle greater than 30 degrees relative to its horizontal plane.
Figure 3:
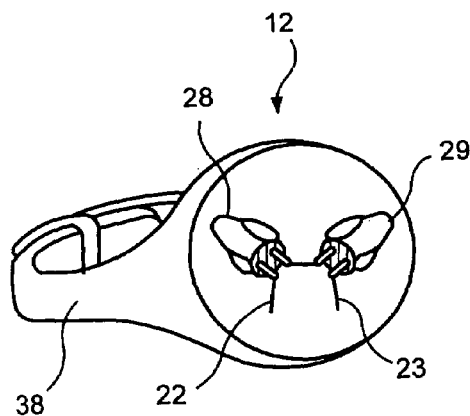
FIG. 3 illustrates a two tube mercury switch of the present invention placed upon a plastic mount assembly for mounting the mercury switch onto a gear shift lever of a manual transmission vehicle.
Figure 4:
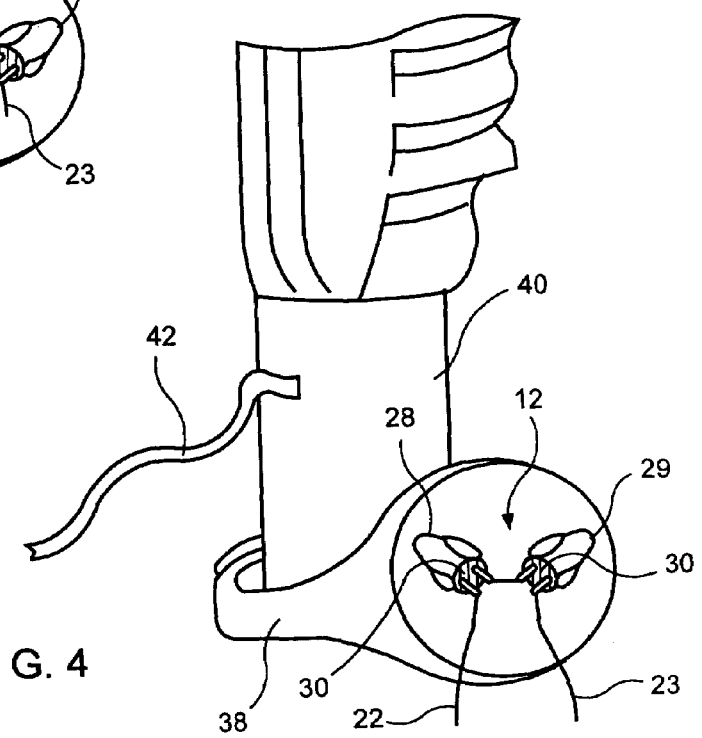
FIG. 4 illustrates a two tube mercury switch of the present invention placed upon a plastic mount assembly which is mounted on about the mid-point of a gear shift lever of a manual transmission vehicle via the plastic mount assembly.

Moreover, as shown in FIG. 2, if the tube 28 is tilted at an angle greater than about 30 degrees relative to the horizontal plane, the mercury 30 in the tube 28 moves to the opposite end or top and thus away from the contact leads 26. This position for the mercury switch 12 disengages the autostart module 18 which prevents the alarm module 20 from activating it. Accordingly, the autostart module 18 is unable to activate the automobile ignition system 24 in the above situation and thus the engine 32 will not autostart.

In a preferred embodiment for the mercury switch 12 as depicted in FIGS. 3-10, the mercury switch 12 in this embodiment consists of two tubes 28, 29 (preferably two small glass tubes) having two contacts 26, 27, external leads 22, 23 and a small amount of mercury 30 in each tube 28, 29. The two tube mercury switch functions similarly to the one tube mercury switch noted above, except for there being the additional tube and contacts, etc. In particular, the external leads 22, 23 (one from opposite ends of the mercury tubes) of the two tube mercury switch are preferably connected in series to the ground lead between the alarm module 20 and the autostart module 18, in order to electrically connect the mercury switch 12 to the autoalarm/auto start system.

It is noted that other switches known in the art, besides mercury switches for accomplishing the objectives of the present invention may also be used.

Referring now specifically to FIGS. 3-6, the mercury switch 12 of the preferred embodiment is mounted on a plastic mount 38 attached to an automobile gear shift lever 40, such that each of the two tubes 28, 29 are preferably mounted at about a 45 degree angle relative to a horizontal plane on the plastic mount 38. The plastic mount 38 is preferably attached to a selected portion of the gear shift lever 40, preferably attached about the midportion of the shift lever 40, underneath the leather boot 42 (shown in FIG. 4). The leather boot 42 covers the gear shift 40. Plastic mount 38 itself, as shown in FIGS. 3-6, has an opening 43 for accommodatingly fitting the plastic mount 38 around the midportion or other selected of the gear shift lever 40. Plastic mount 38 should also have slots 44 therein for fitting tie lements, e.g. fiting plastic ties or metal ties 46 therethrough for securing the plastic mount 38 containing the mercury switch 12 to the gear shift lever 40 of the automobile. The above description of the mounting the mercury switch is by way of example only and is in no way meant to limit the scope of the present invention. For instance, the mercury switch 12 could also be mounted within the gear shift lever instead of on the outside or mounted any other way known in the art for accomplishing the objectives of the present invention.

The autostart module 18 may be a standard autostart module known in the art such as those used to remote start automatic transmission vehicles. It is again noted however, that in the case of the present invention, unlike in automatic transmission cars, activation of the autostart module 18 is dependent upon a switch, mercury switch 12 operatively connected to the gear shift lever 40 of a manual transmission vehicle.

Further, as mentioned above, an alarm module 20 is preferably included as a part of the start switch system 10 of the present invention. The alarm module 20 may be any type of alarm system known in the art. It is also noted that the alarm module 20 functions normally and independently from the mercury switch system, and will re-engage or disengage the ignition kill system, controlled by the remote control 16, valet system, or other means known in the art.

Next, the remote control device 16 and antennae sensor 14 may be any type of car remote and antennae sensor used in the art, e.g. such as those used for autostarting automatic transmission vehicles. The remote control 16 preferably includes a separate button 17 for activation/deactivation of the car alarm 20 alone and also a separate button 19 for activation/deactivation of the autostart module 18. The range or distance for the car remote 16 is preferably at least about 300 feet.

As mentioned, in some embodiments, the antenna sensor 14 is not included but rather the autostart module 18 directly receives the signals transmitted from the remote control device 16 for autostarting the vehicle.

Referring back to the first embodiment, the antennae sensor 14 receives the signals given off by the remote control device 16 and then in turn activates the alarm module 20 to which it is electrically coupled. The alarm module 20 in turn signals the autostart module 18 to which it is electrically coupled to autostart the vehicle. However, if gear shift lever 40 containing the mercury switch 12 is not in neutral (but rather in gear), the mercury switch circuit will be open, thereby preventing the alarm module 20 from activating the autostart module 18, resulting in the car being unable to autostart. In this situation when the alarm module 20 has been activated by the remote 16 but autostart cannot be activated due to the positioning of the gear shift lever 40 (in gear), the alarm is still disengaged even though the car will not autostart. It is preferred that once the alarm module 20 is disengaged it will reengage or re-arm automatically within at least about 20 seconds. Moreover in the interim, between the time it takes for the alarm to re-engage or re-arm itself, an electronic safety switch 50 preferably provided as part of the start switch system 10 requires the driver to depress a clutch pedal before being able to start the vehicle. This additional electronic switch 50 is discussed in more detail below. Also, in other embodiments without an alarm module 20, the remote control 16 in this instance would signal the autostart module 18 directly for autostarting the vehicle.

Also, as discussed above, the start switch system of the present invention preferably further includes a electronic safety switch 50 (as shown in FIGS. 9 and 10) connected in series to the automobiles clutch safety switch 52, preferably provided with the automobile. The clutch safety switch 52 as is known in the art is used in manual transmission cars to prevent the automobile from starting unless the clutch pedal which it is operatively connected to is depressed.

The electronic safety switch 50 provides an added measure of safety/security to vehicles by opening its circuit with the clutch safety switch 52 when the alarm 20 of the car is on (armed) and by closing this circuit when the alarm is off (disarmed). In particular, in instances where the autostart module 18 has not been activated (e.g. mercury switch 12 is out of position) and the alarm is disengaged, the added electronic safety switch 50 provides an added measure of safety by closing it circuit when the alarm 18 is disengaged and the autostart module 18 is not active, requiring the driver of the vehicle to depress the clutch pedal in order to start the vehicle. The above electronic safety switch 50 is to insure that a safety system, whether it is the mercury switch 12 or the factory switch will be employed at all times to ensure safe operation of the vehicle.

Now by way of examples, the operation and use of the start switch system 10 of the present invention is described below and illustrated in FIGS. 9 and 10. It is noted that in all of these examples it is preferred that the park brake is locked into safety position while the car is parked. Further, these examples of operating the start switch system 10 of the present invention are for illustrative purposes only and are in no way meant to limit the scope of the present invention.

The first example is of a car which is parked on relatively level ground with its alarm system 20 armed. The shift lever 40 is in neutral and thus the mercury tubes 28, 29 remain positioned at about 45 degree angles relative to the horizontal plane of the plastic mount 38. In this position, the mercury 30 in each tube 28, 29 remains on the bottom resting on the contact leads 26, 27 so that the circuit formed between the mercury switch 12 and the alarm module 20 and autostart module 18 is closed, thus allowing the autostart module 18 to be activated. Therefore, when the autostart button 19 of the remote control 16 is pressed for autostarting the vehicle, the antennae sensor 14 receives the signal sent out from the remote control 16 and then in turn sends a signal to the alarm module 20. The alarm module in turn sends a signal to the autostart module 18 which in turn (provided that the mercury switch circuit is closed as in this instance) activates the ignition 24 to start the engine 32.

It is noted that once the car is successfully autostarted by remote control, then one would enter the vehicle, put the key in the key ignition slot, release the park brake, and operate the vehicle in exactly the same manner as one would normally operate a manual transmission vehicle. It is also preferred that if one does not enter the vehicle within a predetermined amount of time, that the vehicle is equipped such that the engine 32 will shut off automatically. This auto shut off feature is well known to one skilled in the art.

In the next example the car is parked on relatively level ground with its alarm 20 armed, but this time the gear shift lever 40 is either in $2^{nd}$ (second gear), $4^{th}$ (fourth gear), or reverse. When the shift lever 40 is in any of the above gear positions, the mercury switch 12 is at a 45 degree back tilt angle. In this position, the mercury in tube (1) 28 (shown in FIG. 8) has moved from the contact leads 26 inside the tube. The mercury in tube (2) 29 has a connection with the leads 27. Since the mercury switch circuit is in series, the circuit position is open. With these conditions, when the autostart button 19 on the remote control 16 is pressed and the remote 16 is aimed at the vehicle for autostarting the vehicle, the antennae sensor 14 receives a signal from the remote control 16 and in turn sends a signal to the alarm module 20 to activate it. The alarm module 20 then in turn sends a signal to the autostart module 18 to activate it. However, in this instance, the autostart module 18 cannot be activated to send a signal to the ignition 24 in the vehicle because the mercury switch circuit is open, and thus the vehicle will not auto start.

In a third example, the car is parked on relatively level ground with its alarm 20 armed, and this time the gear shift lever 40 is either in $1^{st}$ (first gear), $3^{rd}$ (third gear), or $5^{th}$ (fifth gear). When the shift lever 40 is either of the above gear positions, the mercury switch 12 is at about a 45 degree (forward tilt) angle. In this position, the mercury 30 in tube (2) 29 (shown in FIG. 8) has moved from the contact 27 leads inside the tube 29. The mercury 30 in tube (1) 28 has a connection with the contact leads 26. Nevertheless, since the mercury switch circuit is in series, the circuit position is open. With these conditions, when the autostart button 19 on the remote control 16 is pressed and the remote 16 is aimed at the vehicle for autostarting the vehicle, the antennae sensor 14 receives a signal from the remote control 16 and in turn sends a signal to the alarm module 20 to activate it. The alarm module 20 then in turn sends a signal to the autostart module 18 to activate it. However, in this instance, the autostart module 18 cannot be activated to send a signal to the ignition 24 in the vehicle because the mercury switch circuit is open, and thus the vehicle will not auto start.

Although a particular embodiment of the invention has been described in detail for purposes of illustration, various modifications and enhancements may be made without departing from the spirit and scope of the invention. Accordingly, the invention is not to be limited except as by the appended claims.

We claim:

1. A start switch system for autostarting by remote control a manual transmission vehicle having a gear shift lever, comprising:
a start switch operatively connected to said gear shift lever, said switch being a mercury switch, said switch being located on said gear shaft; and an autostart unit for autostarting said vehicle, said switch and said autostart unit are electrically coupled to one another independent of movement of said gear shaft, said autostart unit is responsive to the emission of a first set of signals from said remote control for activating said autostart unit to autostart said vehicle, wherein positioning of said gear shift lever operatively connected to said switch determines whether the autostart unit may be activated by said remote control for autostarting said vehicle.

2. The start switch system for autostarting a manual transmission vehicle of claim 1, wherein the mercury switch comprises a first tube and a second tube, said first tube comprises a small amount of mercury, a first pair of external leads and first pair of contact leads, said second tube comprises a small amount of mercury, a second pair of external leads and a second pair of contact leads, said first and said second tubes of said mercury switch are connected to one another via said first and second pair of external leads.

3. The start switch system for autostarting a manual transmission vehicle of claim 1, wherein the start switch system further includes an alarm unit and an antennae sensor, said alarm unit and said antennae sensor are electrically coupled to said switch and said auto start unit, said antennae sensor receives said first set of signals from said remote control device, said antennae sensor in turn transmits a second set of signals for activating said alarm module, said alarm module in turn transmits a third set of signals to activate said autostart unit to auto start said vehicle.

4. The start switch system for auto starting a manual transmission vehicle of claim 3, wherein said mercury switch, antennae sensor, and alarm module are electrically coupled as a series circuit.

5. The start switch system for autostarting a manual transmission vehicle of claim 3, further comprising an electronic safety switch electrically coupled to said alarm unit.

6. The start switch system for autostarting a manual transmission vehicle of claim 5, wherein said electronic safety switch is electrically coupled to said alarm unit as a series circuit, said electronic safety switch opens said series circuit when said alarm unit is armed, said electronic safety switch closes said series circuit when the alarm unit is dis-armed requiring a clutch safety pedal operatively connected to said clutch safety switch to be depressed in order for the vehicle to be able to start manually.

7. The start switch system for autostarting a manual transmission vehicle of claim 3, wherein said remote control device has a first button for activating/deactivating the alarm and second button for activating/deactivating autostart.

8. The start switch system for autostarting a manual transmission vehicle of claim 7, wherein said remote control device has a range of at least about 300 feet.

9. The start switch system for autostarting a manual transmission vehicle of claim 3, wherein said alarm unit if disarmed automatically re-arms itself within at least about 20 seconds, if the vehicle fails to autostart.

10. The start switch system for autostarting a manual transmission vehicle of claim 1, wherein said start switch is mounted on said gear shift lever via a plastic mount assembly.

11. The start switch system for autostarting a manual transmission vehicle of claim 10, wherein said start switch is mounted on said gear shift lever via a plastic mount assembly at about the midpoint of the gear shift lever.

12. The start switch system for autostarting a manual transmission vehicle of claim 10, wherein said plastic mount assembly comprises an opening for accommodatingly fitting said gear shift lever around a selected area of the gear shift lever, said plastic mount assembly comprising a plurality of slots for fitting tie elements there through for securing the start switch to the gear shift lever of the vehicle.

13. The start switch system for autostarting a manual transmission vehicle of claim 10, wherein when said position of said gear shift lever is a position other than neutral gear, the vehicle cannot be autostarted.

14. A mercury start switch system for autostarting a manual transmission vehicle, said manual transmission vehicle having a gear shift lever, a clutch safety switch, an ignition and engine, comprising:
a mercury start switch operatively connected to said gear shift lever, said switch being located on said gear shaft; a remote control device; an antennae sensor for receiving a first set of signals from a remote control device; an alarm unit and; an autostart unit for activating said ignition of said vehicle to autostart said car, said switch, said antennae sensor, said alarm unit and said autostart unit are electrically coupled to one another independent of movement of said gear shaft, said antennae sensor transmits a second set of signals in response to said remote control device for activating said alarm module to transmit a third set of signals to activate said autostart unit to auto start said vehicle wherein the positioning of said gear shift lever which is operatively connected to said mercury switch determines whether the autostart unit may be activated for autostarting said vehicle.

15. The mercury start switch system for autostarting a manual transmission vehicle of claim 14, wherein the mercury switch comprises a first tube and a second tube, said first tube comprises a small amount of mercury, a first pair of external leads and first pair of contact leads, said second tube comprises a small amount of mercury, a second pair of external leads and a second pair of contact leads, said first and said second tubes of said mercury switch are connected to one another via said first and second pair of external leads.

16. The mercury start switch system for autostarting a manual transmission vehicle of claim 14, wherein said mercury switch, antennae sensor, and alarm module are electrically coupled as a series circuit.

17. The mercury start switch system for autostarting a manual transmission vehicle of claim 14, further comprising an electronic safety switch electrically coupled to said alarm unit.

18. The mercury start switch system for autostarting a manual transmission vehicle of claim 17, wherein said electronic safety switch is electrically coupled to said alarm unit as a series circuit, said electronic safety switch opens said series circuit when said alarm unit is armed, said electronic safety switch closes said series circuit when the alarm unit is dis-armed requiring a clutch safety pedal operatively connected to said clutch safety switch to be depressed in order for the vehicle to be able to start manually.

19. The mercury start switch system for autostarting a manual transmission vehicle of claim 14, wherein said remote control device has a first button for activating/deactivating the alarm and second button for activating/deactivating autostart.

20. The mercury start switch system for autostarting a manual transmission vehicle of claim 14, wherein said remote control device has a range of at least about 300 feet.

21. The mercury start switch system for autostarting a manual transmission vehicle of claim 14, wherein said alarm unit if disarmed automatically re-arms itself within at least about 20 seconds, if the vehicle fails to autostart.

22. The mercury start switch system for autostarting a manual transmission vehicle of claim 14, wherein said start switch is mounted on said gear shift lever via a plastic mount assembly.

23. The mercury start switch system for autostarting a manual transmission vehicle of claim 22, wherein said start switch is mounted on said gear shift lever via said plastic mount assembly at about the midpoint of the gear shift lever.

24. The mercury start switch system for autostarting a manual transmission vehicle of claim 22, wherein said plastic mount assembly comprises an opening for accommodatingly fitting said gear shift lever around a selected area of the gear shift lever, said plastic mount assembly comprising a plurality of slots for fitting tie elements there through for securing the start switch to the gear shift lever of the vehicle.

25. The mercury start switch system for autostarting a manual transmission vehicle of claim 14, wherein when said position of said gear shift lever is a position other than neutral gear, the vehicle cannot be autostarted.

26. A method for remote autostarting a manual transmission vehicle having a gear shift lever in neutral gear, using a start switch system, said start switch system comprising a start switch said start switch being a mercury switch and said switch being located on said gear shaft and an autostart unit electrically coupled to one another independent of movement of said gear shaft, said start switch is operatively connected to said gear shift lever, comprising:
aiming a remote control device at said vehicle for autostarting said vehicle; and pressing a button on the remote control device to signal said autostart unit within the vehicle to autostart said vehicle, said position of said gear lever in neutral allows the autostart unit to be activated by said remote control to autostart said vehicle.

* * * * *